(12) United States Patent
Brown

(10) Patent No.: US 6,207,065 B1
(45) Date of Patent: Mar. 27, 2001

(54) INTEGRATED LIQUID DISCHARGE SYSTEM

(75) Inventor: Stuart H. Brown, Severna Park, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/413,777

(22) Filed: Oct. 7, 1999

Related U.S. Application Data
(60) Provisional application No. 60/133,270, filed on May 10, 1999.

(51) Int. Cl.[7] ............................. B01D 37/00; B01D 35/02
(52) U.S. Cl. ........................ 210/769; 210/744; 210/650; 210/104; 210/167; 210/416.1
(58) Field of Search .................... 210/799, 800, 210/805, 769, 103, 104, 744, 416.1, 650

(56) References Cited

U.S. PATENT DOCUMENTS

| | | |
|---|---|---|
| 332,066 | 12/1885 | Facer . |
| 3,861,330 | 1/1975 | Santoleri . |
| 4,053,399 * | 10/1977 | Donnelly et al. ................ 210/151 |
| 4,121,993 * | 10/1978 | Krugmann ....................... 204/149 |
| 4,170,551 * | 10/1979 | Honour ............................ 210/187 |
| 4,197,200 | 4/1980 | Alig . |
| 4,303,055 | 12/1981 | Fixler . |
| 4,647,371 | 3/1987 | Schmitt et al. . |
| 4,649,281 | 3/1987 | Schmitt et al. . |
| 4,797,089 | 1/1989 | Schubach et al. . |
| 4,877,395 | 10/1989 | Schubach et al. . |
| 5,053,140 * | 10/1991 | Hurst ............................... 210/704 |
| 5,361,710 | 11/1994 | Gutmark et al. . |
| 5,408,874 | 4/1995 | Fleck, Sr. et al. . |
| 5,505,840 | 4/1996 | Caldwell . |
| 5,624,574 | 4/1997 | Caldwell . |
| 5,807,485 * | 9/1998 | Caplan et al. .................. 210/610 |

\* cited by examiner

*Primary Examiner*—Robert Popovics
(74) *Attorney, Agent, or Firm*—John Forrest; Jacob Shuster

(57) ABSTRACT

Liquid waste generated aboard a maritime vessel is separated into oily and non-oily components for separate treatment to obtain flow streams having different waste contents. Those of the flow streams having waste content reduced by the treatment are discharged overboard while the other flow streams having concentrated waste content are subject to incineration.

2 Claims, 2 Drawing Sheets

INTEGRATED LIQUID DISCHARGE SYSTEM

This application is a continuation of the provisional application, Ser. No. 60/133,270 filed May 10, 1999.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the processing of waste material, more particularly processing waste material generated aboard marine vessels.

Environmental regulations have increasingly restricted the discharge of ship-generated wastewaters overboard. It is anticipated that future discharges of untreated blackwater (e.g., urinal and water closet wastes), graywater (e.g., shower, sink, galley, and laundry wastes) and oily wastewater will be prohibited in many areas of the world.

Shipboard liquid wastewater has been generally classified as either non-oily waste or oily waste. The non-oily fractions include blackwater and graywater. Bilgewater and waste oil make up the shipboard oily waste. Blackwater (or sewage) is the waste that is generated by water closets and urinals. Typically, blackwater consists of feces, urine, wipes, and flushing water. Graywater is wastewater generated by sinks, showers, laundry equipment and galley and scullery equipment. Typically, graywater consists of water, dirt, detergents, food particles, hair, lint, and numerous other contaminants.

Bilgewater originates as seal and equipment leaks, condensation, evaporator dumps, and fuel strippings. Typically, bilgewater consists primarily of water (usually greater than 99 percent) with small amounts of fuel oil, lubricating oil, detergents, particulate matter, corrosion products, and other contaminants. Waste oil is a mixture of oil and water separated from the bilgewater. The fraction of water contained in the waste oil can vary by as much as 10 to 90 percent. The fraction of waste oil contains predominantly fuel and lubricating oils (greater than 90 percent of the bulk oil), with smaller amounts of detergent and emulsified water. The bulk oil can have associated therewith a recoverable heating value.

On large ships, current practice involves storing the liquid wastes onboard when the ship is in transit or is moored in restricted waters, until such time as when the liquid wastes can be off-loaded to shore facilities or to a barge. Certain ships are designed to have sufficient storage capacity to retain liquid wastes for a maximum of 6 hours. If suitable off loading facilities are not available, such ship must alter its schedule in order to discharge at sea beyond coastal waters. Other concerns involve the high disposal costs when off-loading liquid wastes to barges, operational security concerns when off-loading to shore facilities in hostile ports, and safety and accidental discharge concerns associated with barging.

As a result of increasingly stringent water quality standards being imposed under state, national, and international regulations, wastewater offload and disposal costs in domestic and foreign ports and harbors continue to increase.

In view of the foregoing, it is an object of the present invention to provide a system for treating liquid wastes aboard ship, thereby obviating the need for discharging ship-generated wastewaters overboard.

SUMMARY OF THE INVENTION

The present invention advantageously affords maritime vessels the capability to treat liquid wastes aboard ship, thereby maximizing shore independence and minimizing waste off-load costs. By processing all liquid waste streams generated onboard ship, the present invention enables the maritime vessels to navigate global waters without restrictions imposed by current and future wastewater discharge regulations.

Typical embodiments of the present invention feature the disposal of all non-hazardous liquid wastes, accomplished through the combination of liquid waste concentration and thermal incineration. The concentrating of liquid waste into dense sludge reduces the necessary size of the thermal incineration unit in which the sludge is to be burned so as to render the apparatus associated with the present invention especially suitable for applications wherein space is at a premium, such as shipboard installations.

The present invention represent s a unique methodology for treating and reducing the blackwater, graywater, bilgewater and waste oil which are generated aboard ship by combining volume reduction and thermal incineration technologies to treat and eliminate virtually all shipboard liquid waste, and effectuates an over-arching strategy for managing shipboard liquid wastes involving integration of membrane filtration and thermal incineration technologies.

The present invention features three distinct elements or constituents, viz., (i) non-oily liquid waste treatment, (ii) oily liquid waste treatment and (iii) incineration. Each of the two waste treatment elements (i.e. non-oily liquid waste treatment and oily liquid waste treatment) has associated therewith two different types of liquid waste streams. Non-oily liquid waste treatment encompasses a blackwater waste stream and a graywater waste stream. Oily liquid waste treatment encompasses an oily wastewater (or "oily waste") stream and a waste oil stream.

The wastewater discharges to be concentrated and/or directly combusted include: sewage (blackwater), graywater, bilgewater, waste oils, fuel-compensated ballast water strippings and fuel tank strippings. Both the oily wastewater stream and the waste oil stream derive from the aggregate of the various forms of bilgewater to include fuel-compensated ballast water strippings and fuel tank strippings. Oil/water separation means separates bulk oil (which is directed to the waste oil tank) from the oily wastewater (which is directed to the oily wastewater tank). The terms "bilge waste" and "bilgewater waste" are sometimes meant to be distinguished from fuel strippings (e.g., fuel-compensated ballast water strippings and fuel tank strippings). Unless otherwise indicated herein, the terms "bilge waste" and "bilgewater waste" refer to liquid waste which consists primarily of water (usually greater than 99 percent) and which contains small amounts of contaminants such as fuel oil, lubricating oil, detergents, particulate matter, corrosion products, and/or other contaminants. Hence, according to the present invention, four different liquid waste streams are individually treated, and then either discharged overboard in an acceptably clean effluent form, or subjected to incineration. Four separate treatment subsystems, each corresponding to a particular waste stream, ultimately direct treated waste to a central incineration apparatus. Two or three of the four treatment subsystems (i.e., those pertaining to graywater waste and to oily wastewater, and possibly that pertaining to blackwater waste) also direct overboard, via discharge lines, a sufficiently clean portion of the treated waste. One of the four treatment subsystems (i.e., that pertaining to waste oil) leads to incineration but permits retention for possible use in helping to fuel such incineration.

Therefore, the subsystems referred to herein produce: (i) a clean effluent that can be discharged overboard; and, (ii) concentrated wastewater streams which can be thermally incinerated by one of the subsystems. An underlying premise of the present invention is to minimize each of the waste streams so that shipboard thermal incineration technologies can process the volume of waste. The present invention not only incorporates the hardware to process the different waste streams, but also incorporates the control logic necessary to handle the various generation rates and peak loads.

According to typical embodiments of the present invention, the three constituents (viz., non-oily liquid waste treatment, oily liquid waste treatment and incineration) operate basically as follows:

A. Non-oily liquid waste treatment. Ultrafiltration technology and other minimization techniques are used: (i) to concentrate the volume of non-oily liquid waste; and (ii) to discharge clean water overboard. Graywater is treated so that a portion thereof is concentrated and incinerated, and a portion thereof is discharged in a clean effluent form. Blackwater can also be treated so that a portion thereof is concentrated and incinerated, and a portion thereof is discharged in a clean effluent form. Alternatively, depending on the pertinent environmental safety standards (which are generally more stringent for blackwater than for graywater) and on the offshore location of the ship, the blackwater can be treated in its entirety.

B. Oily liquid waste treatment. Oily wastewater is concentrated by both conventional methods and ultrafiltration. These techniques are used: (i) to concentrate the volume of oily liquid waste; (ii) to discharge clean water overboard; and, (iii) to remove an amount of waste oil from the oily wastewater ("skim bulk oil off the top," so to speak), and hold this waste oil. The waste oil is collected aboard ship in a waste oil tank and contains a recoverable heating value. Hence, many embodiments covered by the present invention utilize the waste oil to help incineration.

C. Incineration. The incineration device must have the capability to incinerate all concentrated liquid waste in addition to the waste oil. The overall system requires concentration of the liquid waste streams in order to minimize the size and energy requirements of the incineration unit.

Notable among the advantages of the present invention are the following: Firstly, sewage disposal costs are eliminated and operational capability provided in restricted waters. Secondly, operational security concerns are alleviated. Thirdly, safety and accidental discharge concerns associated with barging are eliminated. Fourthly, a more efficient methodology for elimination of liquid wastes is provided.

Current practices associated with ship-generated waste, involves the storing of liquid wastes aboard ship in storage tanks. When such liquid waste storage tanks become filled to capacity, other resources must be called upon to handle the liquid wastes. In accordance with the present invention, the liquid waste streams onboard ship are processed to allow the ship to navigate global waters without restrictions imposed by current and future environmental regulations limiting wastewater discharge.

Other objects, advantages and features of the present invention will become apparent from the following detailed description of the invention when considered in conjunction with the accompanying drawings.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
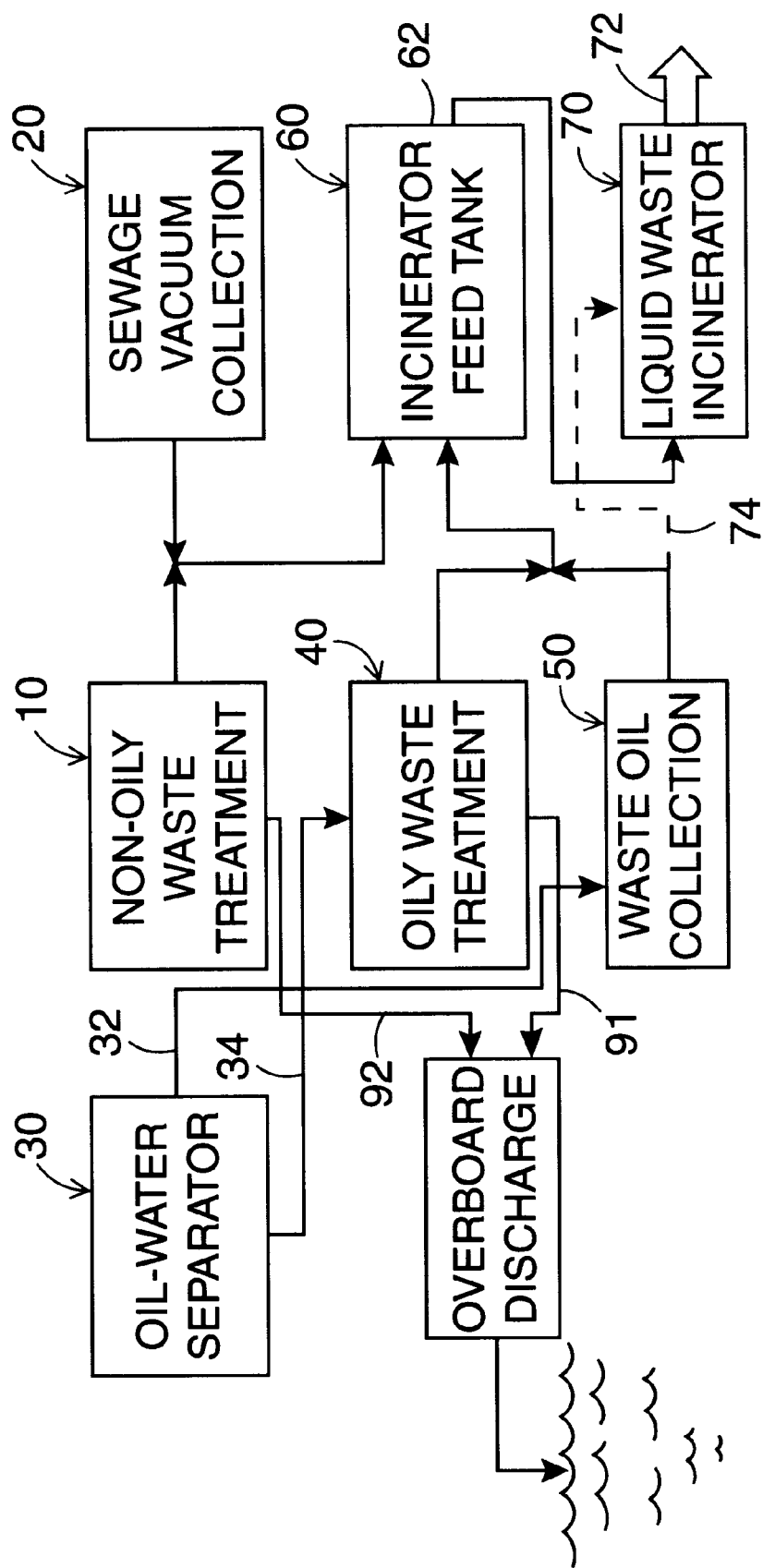
FIG. 1 is a schematic block diagram, illustrating operation of a preferred embodiment of the present invention.

Referring now to FIG. 1, an integrated liquid discharge system diagrammed therein includes non-oily waste (graywater) concentration treatment 10, sewage (blackwater) vacuum collection 20, an oil/water separator (OWS) 30, oily waste treatment 40, waste oil collection 50, incinerator feed control 60 and liquid waste incinerator 70.

Four liquid waste streams (graywater, blackwater, oily waste and waste oil) are thereby treated independently, prior to thermal elimination. Graywater concentration treatment 10, blackwater sewage vacuum unit 20, oily waste water concentration treatment 40 and waste oil collection 50 are the four main processing subsystems for respectively generating the graywater waste stream, the blackwater waste stream, the oily wastewater stream and the waste oil stream, respectively.

Graywater concentration treatment 10 implements membrane ultrafiltration technology so as to concentrate graywater constituents, and produce an effluent meeting discharge regulations.

Blackwater sewage vacuum unit 20 effectuates vacuum collection or other minimization techniques so as to require less flushing water, thereby reducing the volume of blackwater over conventional "gravity flush" systems.

A conventional oil/water separator 30 (e.g., a gravity, parallel plate OWS) is used to remove bulk oil (waste oil) from the oily wastewater. Most Navy ships are equipped with an OWS (comprising one or more gravity parallel plate oil/water separators) to remove bulk oil from the oily wastewater.

As diagrammed in FIG. 1, the bulk oil is conducted along a flow path 32 from oil/water separator OWS 30 to waste oil collector 50 for storage. The remaining oily wastewater (from which the bulk oil has been separated by OWS 30) is conducted along flow path 34 from OWS 30 to oily water treatment 40.

Ultrafiltration is effected by the oily water treatment 40 to remove emulsified oil from the oily wastewater, and to thereby produce an effluent meeting discharge regulations.

Waste oil is held aboard ship in the waste oil collector 50 for processing by the incinerator 70. According to various embodiments, the waste oil stored in collector 50 can be used, in contributory fashion, as fuel for incinerator 70.

An essential feature of the system depicted in FIG. 1 is the incinerator 70, which is capable of: reducing all concentrated liquid wastes, including waste oil, to an inert ash; releasing a gaseous exhaust 72 meeting air emissions regulations; and, controlling (e.g., via a controller) the waste streams and their feed rates.

Generation rates of non-oily wastewaters are dependent on crew complement and typically expressed as gallons per crew member per day (GPCD). Shipboard oily wastewater and waste oil is highly variable. The generation rates of these wastes are more dependent on hull size, installed equipment, and operation and maintenance requirements than the crew size. Oily waste generation rates are expressed for each ship in gallons per day (gpd).

The system depicted in FIG. 1 is sized for a nominal 43 gal/hour incinerator 70, and is designed to process four different waste streams consisting of: graywater, blackwater, oily wastewater and waste oil. Graywater concentration treatment 10 processes graywater concentrate at 3.8 gallons/hour. Blackwater sewage vacuum unit 20 processes vacuum collected sewage generated at 30 gallons/hour. Oily water concentration collector 40 processes oily waste concentrate at 6.0 gallons/hour. Waste oil tank 50 processes waste oil at 7 gallons/hour. Incinerator feed tank 60, which receives the three processed waste streams, has a nominal capacity of 150 gallons.

Three of the four different waste streams (graywater, blackwater and oily wastewater) are respectively conducted from their corresponding processors (graywater concentration treatment 10, blackwater sewage vacuum unit 20 and oily water concentration collection 40, respectively) to incinerator feed tank 60, whereupon the ensuing collective processed waste is conducted along flow path 62 from such incinerator feed tank 60 to incinerator 70. Waste oil is directly conducted from waste oil collector 50 to incinerator 70 along flow path 74.

The liquid waste streams processed respectively by graywater concentration treatment 10, blackwater sewage vacuum unit 20 and oily water concentration treatment 40 must be concentrated, in order to minimize the size and energy requirements of incinerator 70.

Certain parameters or characteristics associated with the system depicted in FIG. 1 will be variable in accordance with the liquid waste generation rates corresponding to the four liquid waste streams. Such parameters/characteristics include: (i) the respective sizes of the tanks corresponding to the four liquid waste streams; (ii) the processing rate of incinerator 70; and crew compliment. In other words, there is a principle of proportionality for increase or decrease of: (i) each processing tank size in accordance with the corresponding liquid waste generation rate; and/or, (ii) the incinerator processing rate in accordance with the liquid waste generation rates, considered both individually and collectively.

Figure 2:
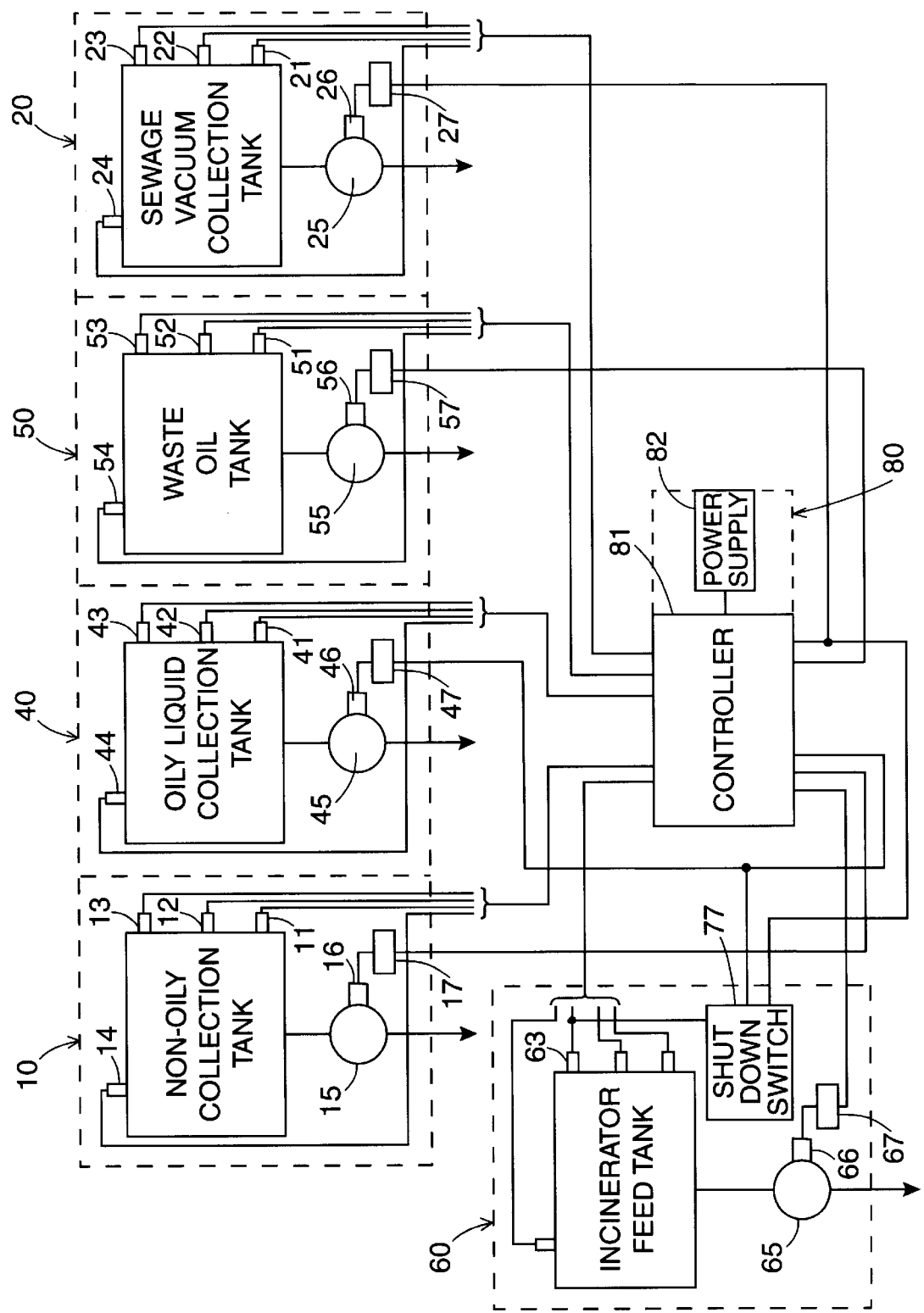
FIG. 2 is a schematic diagram, in terms of control of the preferred embodiment as shown in FIG. 1.

With continued reference to FIG. 1 and FIG. 2, the four different waste streams must be controlled when they are sent to incinerator 70. Each of the processing tanks associated with subsystems 10, 20, 40 and 50, as well as the incinerator feed tank 60, has associated therewith a low-level sensor, a mid-level sensor, a high-level sensor, an "extra" high-level sensor, a motorized feed pump and a switch. Every sensor is capable of sending a signal to a control unit 80, which is capable of sending electrical current to every feed pump.

Control unit 80 includes a controller 81, a power supply (e.g., direct current) 82 and switches 17, 27, 47, 57 and 67 respectively associated with subsystems 10, 20, 40, 50 and 60. Upon receipt by controller 81 of the appropriate input signal from a sensor, controller 81 sends an output signal to the switch which corresponds to that sensor. This output signal either opens or closes the circuit between power supply 82 and the pump motor which corresponds to the pump which corresponds to that sensor.

The tank of graywater concentration treatment 10 has associated therewith low-level sensor 11, mid-level sensor 12, high-level sensor 13, extra high-level sensor 14, feed pump 15, pump motor 16 and switch 17. The collection tank of the blackwater sewage vacuum unit 20 has associated therewith low-level sensor 21, mid-level sensor 22, high-level sensor 23, extra high-level sensor 24, feed pump 25, pump motor 26 and switch 27. The collection tank of oily water treatment 40 has associated therewith low-level sensor 41, mid-level sensor 42, high-level sensor 43, extra high-level sensor 44, feed pump 45, pump motor 46 and switch 47. Waste oil tank 50 has associated therewith low-level sensor 51, mid-level sensor 52, high-level sensor 53, extra high-level sensor 54, feed pump 55, pump motor 56 and switch 57. Incinerator feed tank 60 has associated therewith low-level sensor 61, mid-level sensor 62, high-level sensor 63, extra high-level sensor 64, feed pump 65, pump motor 66 and switch 67. Each of the foregoing five processing tanks of subsystems 10, 20, 40 and 50 and feed tank 60 is controlled in a similar manner.

In a particular processing or feed tank, when the corresponding low-level sensor (i.e., low-level sensor 11, 21, 41, 51 or 61) senses an insufficient level in the tank, the corresponding low-level sensor sends a signal to control unit 80, which consequently shuts off the corresponding feed pump (i.e., feed pump 15, 25, 45, 55 or 65), thereby preventing the pump from running dry.

In a particular processing or feed tank, when the level of liquid reaches the corresponding mid-level sensor (i.e., mid-level sensor 12, 22, 42, 52 or 62) in the tank, the corresponding mid-level sensor sends a signal to control unit 80, which consequently turns on the corresponding feed pump (i.e., feed pump 15, 25, 45, 55 or 65), thereby activating the conduction of the processed liquid stream from the tank to either incinerator feed tank 60 (if the tank is graywater concentration collection tank 10, blackwater sewage vacuum unit 20 or oily water concentration collection tank 40) or incinerator 70 (if the tank is waste oil tank 50 or incinerator feed tank 60).

In a particular processing or feed tank, when the high level sensor (i.e., high-level sensor 13, 23, 43, 53 or 63) sends a signal to control unit 80 to provide a warning that the processing tank is overfilling and may generally provide an indication that the corresponding subsystem is not be working properly so as to require maintenance.

In a particular processing or feed tank, the extra high-level sensor (i.e., extra high-level sensor 14, 24, 44, 54 or 64) indicates that the tank is about to overflow, and consequently control unit 80 shuts down the corresponding treatment subsystem. For example, extra high-level sensor 24, when sensing impending overflow of blackwater sewage vacuum unit 20, sends a signal to control unit 80, which causes shutdown of the vacuum pertaining to blackwater sewage vacuum unit 20, thereby preventing flushing of the water closets. The extra high level sensor 64 associated with the incinerator feed tank 60 will also operate a shut down switch 77 connected to the pump motors 26 and 46 to prevent infeed of the tanks of subsystems 20 and 40.

The foregoing system as depicted in FIGS. 1 and 2 is interrelated with the existing overboard discharge lines 91 and 92 when the liquid waste streams can be offloaded to port facilities or legally discharged over the side. The incinerator 70 of the system is used all other times. Alternatives to the foregoing described arrangement would be to install various thermal treatment devices that process aqueous waste materials. Vortex incinerators, acoustically tuned incinerators, microwave technology, hydrothermal oxidation units, and plasma-arc thermal systems are but a few of the many thermal devices that can be integrated into the system.

Other embodiments of this invention will be apparent to those skilled in the art from a consideration of the foregoing description. Various omissions, modifications and changes to the described features of the system may be made by one skilled in the art without departing from the true scope and spirit of the invention.

What is claimed is:

1. A method of processing shipboard generated liquid waste, comprising the steps of separating said liquid waste into a non-oily component consisting of blackwater and graywater and an oily component consisting of wastewater and waste oil; treating each of said components separately to obtain a plurality of flow streams therefrom with different waste contents; selectively discharging those of the flow streams having the waste contents reflected by a substantially cleansed portion of the liquid waste as compared to a remainder of the flow streams having a concentration of the liquid waste; and subjecting the remainder of said flow streams having said concentration of the liquid waste to incineration.

2. A system for processing shipboard generated liquid waste, including means for separating said liquid waste into a non-oily component consisting of blackwater and graywater and an oily component consisting of wastewater and waste oil; means for respectively treating each of said separated non-oily and oily components to obtain a plurality of flow streams therefrom with different waste contents; selective control means for discharging those of the flow streams having the waste contents thereof reflected by a cleansed portion of the liquid waste as compared to a remainder of the flow streams having a concentration of the liquid waste; and means for subjecting said remainder of the flow streams to incineration.

* * * * *